United States Patent
Curtis, Jr. et al.

(10) Patent No.: US 7,281,753 B2
(45) Date of Patent: Oct. 16, 2007

(54) VEHICLE ENCLOSURE

(75) Inventors: Fred Curtis, Jr., Princeton, MA (US); Gary Orrell, Millbury, MA (US)

(73) Assignee: Curtis Industries LLC, Worcester, MA (US)

( * ) Notice: Subject to any disclaimer, the term of this patent is extended or adjusted under 35 U.S.C. 154(b) by 0 days.

(21) Appl. No.: 11/342,432

(22) Filed: Jan. 30, 2006

(65) Prior Publication Data

US 2007/0182204 A1  Aug. 9, 2007

(51) Int. Cl.
*B60J 1/08* (2006.01)
(52) U.S. Cl. .............. 296/146.1; 296/146.11; 296/146.12
(58) Field of Classification Search ............ 296/146.1, 296/146.12, 146.11, 155
See application file for complete search history.

(56) References Cited

U.S. PATENT DOCUMENTS

| | | | | |
|---|---|---|---|---|
| 2,460,399 A | * | 2/1949 | Schassberger | 296/148 |
| 2,682,427 A | | 6/1954 | Bright | 296/148 |
| 3,387,406 A | * | 6/1968 | Coker et al. | 296/50 |
| 3,454,299 A | * | 7/1969 | Hewitt et al. | 296/50 |
| 3,567,274 A | * | 3/1971 | Kaptur, Jr. et al. | 296/50 |
| 3,592,504 A | * | 7/1971 | Sandor | 296/70 |
| 3,623,764 A | * | 11/1971 | Jacobus | 296/50 |
| 3,747,273 A | * | 7/1973 | Johnson | 49/394 |
| 4,076,301 A | * | 2/1978 | Gergoe | 296/57.1 |
| 4,299,058 A | * | 11/1981 | Spaulding | 49/386 |
| 4,335,911 A | * | 6/1982 | Taylor | 292/262 |
| 4,372,603 A | * | 2/1983 | Stanczak et al. | 296/146.12 |
| 4,437,410 A | * | 3/1984 | Stoller et al. | 105/378 |
| 4,621,859 A | | 11/1986 | Spicher | 296/78 R |
| 4,773,694 A | | 9/1988 | Gerber | 296/77.1 |
| 4,929,004 A | * | 5/1990 | Chidester | 292/267 |
| 4,932,714 A | | 6/1990 | Chance | 296/148 |
| 5,004,286 A | * | 4/1991 | Taylor et al. | 296/24.46 |
| 5,203,601 A | | 4/1993 | Guillot | 296/77.1 |
| 5,217,275 A | | 6/1993 | Ridge | 296/77.1 |
| 5,259,656 A | | 11/1993 | Carroll | 296/77.1 |
| 5,276,745 A | | 1/1994 | Revelli, Jr. | 385/14 |
| 5,310,235 A | | 5/1994 | Seymour et al. | 296/77.1 |
| D349,265 S | | 8/1994 | Patton | D12/14 |
| 5,388,881 A | | 2/1995 | Spencer et al. | 296/77.1 |
| 5,393,118 A | | 2/1995 | Welborn | 296/147 |
| 5,404,618 A | * | 4/1995 | Heiler et al. | 16/261 |
| 5,429,404 A | | 7/1995 | King, Sr. et al. | 296/79 |
| 5,529,369 A | | 6/1996 | Welborn | 296/77.1 |
| 5,544,449 A | * | 8/1996 | Amelio et al. | 49/383 |
| 5,588,690 A | | 12/1996 | Showalter | 296/77.1 |

(Continued)

OTHER PUBLICATIONS

"Undated" brochure; Mobile Equipment Enclosures Ltd., no date provided.

*Primary Examiner*—Kiran B. Patel
(74) *Attorney, Agent, or Firm*—Nields & Lemack (57) ABSTRACT

Door assembly includes a doorframe that can be secured to the vehicle, and a preferably rigid door that is movable between an open and closed position. The door can be secured to the vehicle in the open position so that the passengers have the option of riding in the vehicle while the door remains open. A hinge system minimizes the clearance necessary to open and close the door, and provides an optional assist feature that helps urge or bias the door to the open or closed position and maintain it there.

18 Claims, 11 Drawing Sheets

U.S. PATENT DOCUMENTS

| | | | |
|---|---|---|---|
| 5,632,065 A * | 5/1997 | Siladke et al. | 16/335 |
| 5,685,594 A * | 11/1997 | Harper | 296/51 |
| 6,030,024 A * | 2/2000 | Schmidhuber et al. | 296/146.12 |
| 6,158,801 A | 12/2000 | Tucker | 296/146.1 |
| 6,161,336 A * | 12/2000 | Ziv-Av | 49/260 |
| 6,213,535 B1 | 4/2001 | Landmesser et al. | 296/146.12 |
| 6,276,745 B1 | 8/2001 | Wilson | 296/155 |
| 6,293,610 B1 | 9/2001 | Howard | 296/148 |
| 6,382,705 B1 * | 5/2002 | Lang et al. | 296/155 |
| 6,412,877 B1 * | 7/2002 | Faison | 296/183.2 |
| 6,439,637 B1 | 8/2002 | Tyrer | 296/79 |
| 6,547,304 B1 | 4/2003 | Conner et al. | 296/79 |
| 6,658,803 B2 * | 12/2003 | Szyjkowski | 52/213 |
| D490,579 S | 5/2004 | Cunningham | D32/16 |
| 6,742,826 B2 * | 6/2004 | Humphrey et al. | 296/51 |
| 6,748,776 B2 * | 6/2004 | Bullock et al. | 70/212 |
| 6,764,130 B1 * | 7/2004 | Hull | 296/186.4 |
| 6,773,055 B1 * | 8/2004 | Stoudt et al. | 296/153 |
| 6,776,445 B1 | 8/2004 | Conner et al. | 296/79 |
| 6,779,825 B1 * | 8/2004 | Greenert et al. | 296/51 |
| 6,827,390 B2 * | 12/2004 | Zummallen et al. | 296/146.11 |
| D508,004 S | 8/2005 | Metros et al. | D12/196 |
| 6,926,342 B2 | 8/2005 | Pommeret et al. | 296/155 |
| 6,942,277 B2 * | 9/2005 | Rangnekar et al. | 296/146.11 |
| 6,997,504 B1 * | 2/2006 | Lang et al. | 296/146.12 |
| 7,070,225 B2 * | 7/2006 | Herrmann | 296/146.6 |
| 7,080,868 B2 * | 7/2006 | McClure et al. | 296/146.11 |
| 7,096,538 B2 * | 8/2006 | Liang et al. | 296/146.11 |
| 7,147,257 B2 * | 12/2006 | Johansen et al. | 292/341.15 |
| 7,150,486 B2 * | 12/2006 | Ichinose | 296/51 |
| 7,165,800 B2 * | 1/2007 | Thiele et al. | 296/57.1 |
| 2005/0110298 A1 * | 5/2005 | Fin et al. | 296/146.5 |
| 2005/0127712 A1 * | 6/2005 | Castillo | 296/146.12 |
| 2006/0087145 A1 * | 4/2006 | Curtis et al. | 296/80 |
| 2006/0087149 A1 * | 4/2006 | Curtis et al. | 296/146.1 |
| 2006/0087150 A1 * | 4/2006 | Curtis et al. | 296/146.1 |

* cited by examiner

VEHICLE ENCLOSURE

BACKGROUND OF THE INVENTION

Enclosures for vehicles, including battery powered or gas or diesel powered vehicles such as recreational vehicles, utility terrain vehicles (UTV's), such as the Kobota RTV and Polaris RANGER, golf carts, neighborhood electric vehicles (NEV'S, which can be street-legal), tractors, and other 2-wheel drive, 4-wheel drive, all-wheel drive capable vehicles, on or off-road, to enclose a passenger compartment and/or protect the occupants from inclement weather, are well known. In general, cabs for such vehicles utilize conventional front or rear hinged doors. In addition to being unattractive, such enclosures suffer from various drawbacks, including difficulty in obtaining ingress and egress from the passenger compartment, lack of durability, a requirement that the doors remain closed during operation of the vehicle, unattractiveness, etc.

For example, U.S. Pat. No. 6,293,610 to Howard discloses a door system for a golf cart-like street legal vehicle. A pair of hinged doors is removable from framework on each side of the vehicle. The framework is permanently mounted to existing structure on the vehicle.

None of the foregoing embodiments provides an aesthetically pleasing, durable, weather resistant, and easy to operate door system for vehicles such as utility terrain vehicles. In addition, none provides a door assembly where the door can be stored in the open position in an aesthetically pleasing manner and without risk of it unexpectedly and/or undesirably slamming shut during movement or sudden stopping of the vehicle.

SUMMARY OF THE INVENTION

The problems of the prior art have been overcome by the present invention, which provides a door assembly for a vehicle such as a utility vehicle. The door assembly includes a doorframe secured to the vehicle, and a preferably rigid door that is movable between an open position allowing ingress and egress from the vehicle, and a closed position. The door can be secured to the vehicle in the open position so that the passengers have the option of riding in the vehicle while the door remains open. Preferably the door is contoured to match the contour of the vehicle, so that even when the door is stored in the open position, the vehicle remains aesthetically pleasing. A hinge system is utilized that minimizes the clearance necessary to open and close the door, and provides an optional assist feature that helps urge or bias the door to the open or closed position and maintain it there. Preferably the hinges are virtually hidden from view when viewed from the exterior of the vehicle, and are completely hidden when so viewed when the door is in the closed position. The door assembly remains aerodynamic and aesthetically pleasing whether in the open or closed position. Minimal modification of the vehicle is necessary to install the door assembly. A simultaneous or near simultaneous dual latching system is used to ensure a good seal when the door is closed.

DETAILED DESCRIPTION OF THE INVENTION

Figure 1:
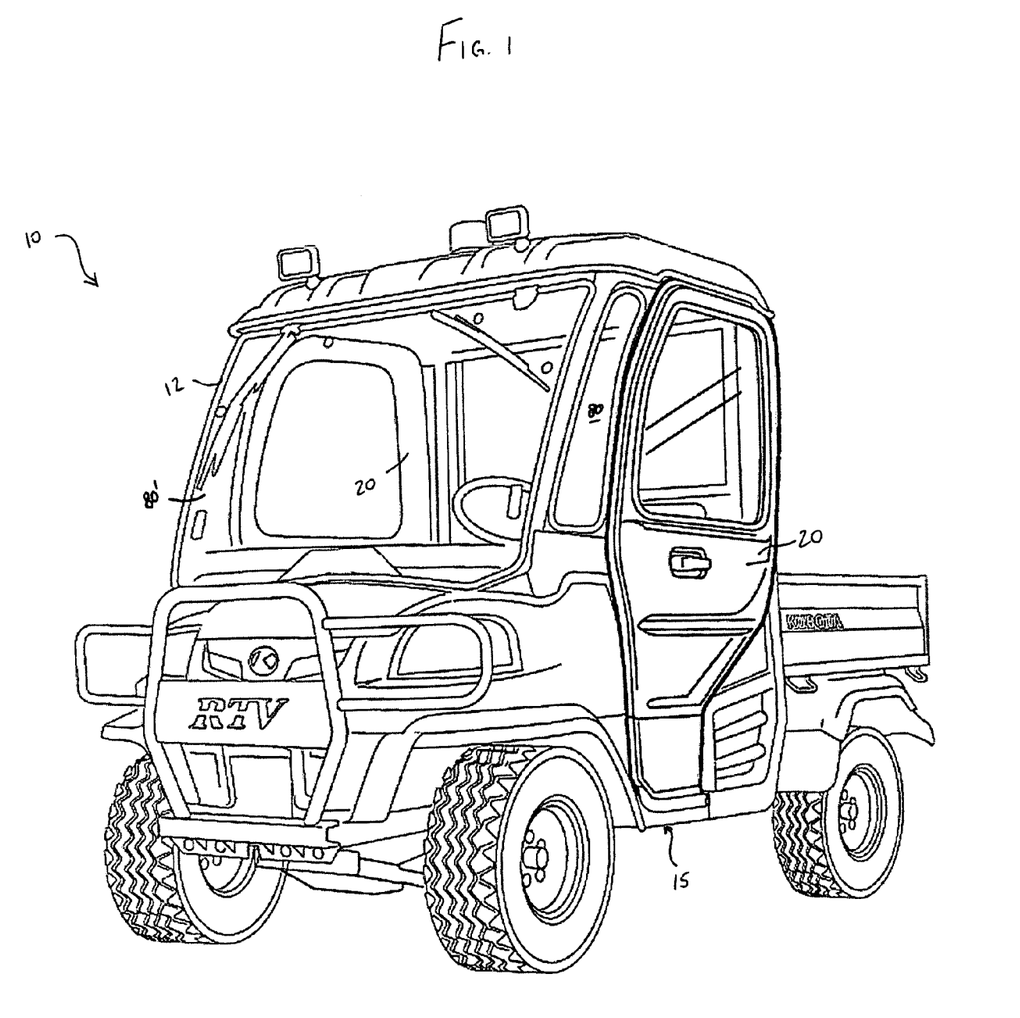
FIG. 1 is a perspective view of a utility terrain vehicle equipped with the door assembly in accordance with the present invention.
Figure 2:
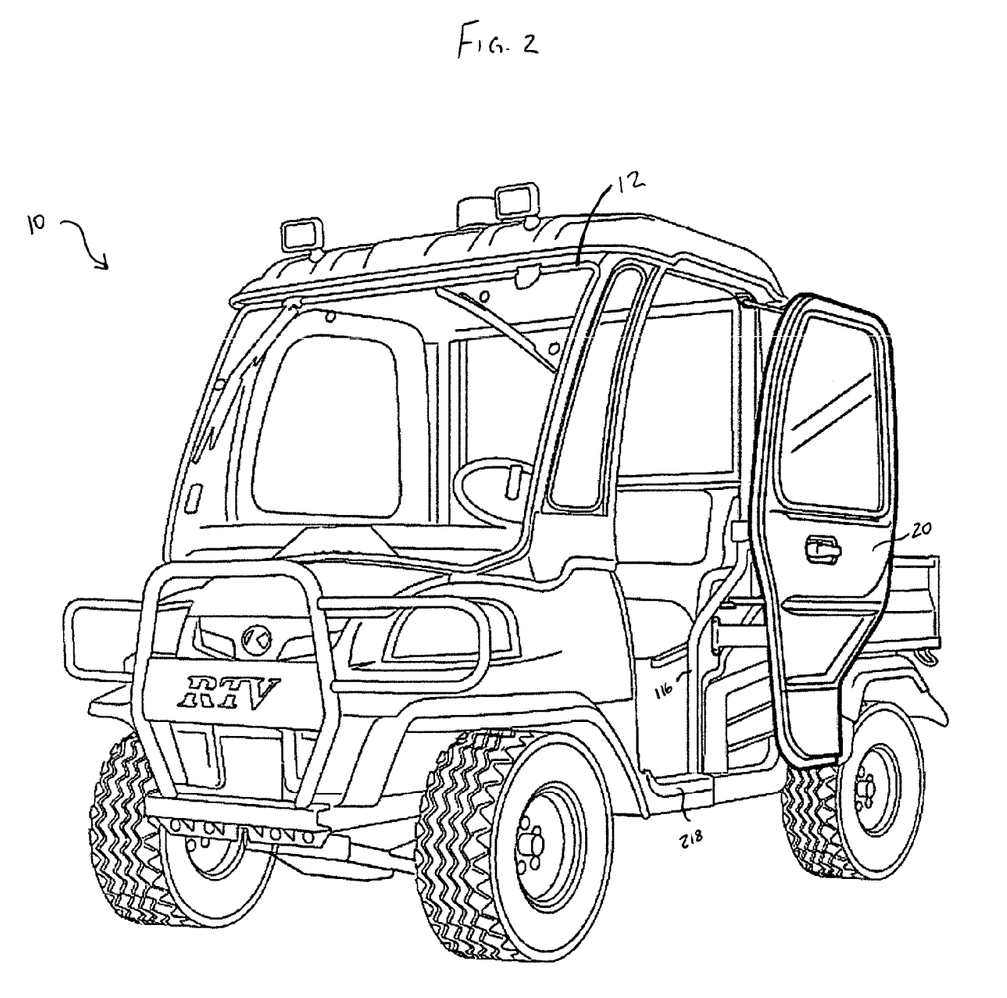
FIG. 2 is a perspective view of a utility terrain vehicle equipped with the door assembly, shown in the open position, in accordance with the present invention.

The door assembly of the present invention can be used on vehicles such as recreational vehicles, on or off-road vehicles such as utility terrain vehicles, NEV's, tractors, 2-wheel drive, 4-wheel drive and all-wheel drive capable vehicles although for ease of illustration, utility vehicles such as the rough terrain vehicles available from Kobota will be exemplified herein. Such vehicles are generally available with 3-cylinder, 4-cycle engines, are diesel powered, are 2-wheel drive or 4-wheel drive capable, weight about 1800 to about 2000 pounds, and have a maximum travel speed of about 25 MPH. Other utility vehicles have a maximum speed of about 40-50 MPH. In general, referring to FIGS. 1 and 2, the vehicle 10 has front and rear wheels, a chassis 15, on which is built a passenger compartment (with suitable seating, generally for two passengers), and a windshield 12, as shown. Those skilled in the art will appreciate that a roof and windshield 12 can be original equipment or added in the aftermarket.

A pair of doors 20 in accordance with the present invention is shown in the closed position on opposite sides of the vehicle 10. One of the doors 20 is shown stored in the open position in FIG. 2. In the closed position of FIG. 1, the doors close the access opening to the passenger compartment defined in part by the vehicle chassis, the roof and the windshield.

Figure 3:
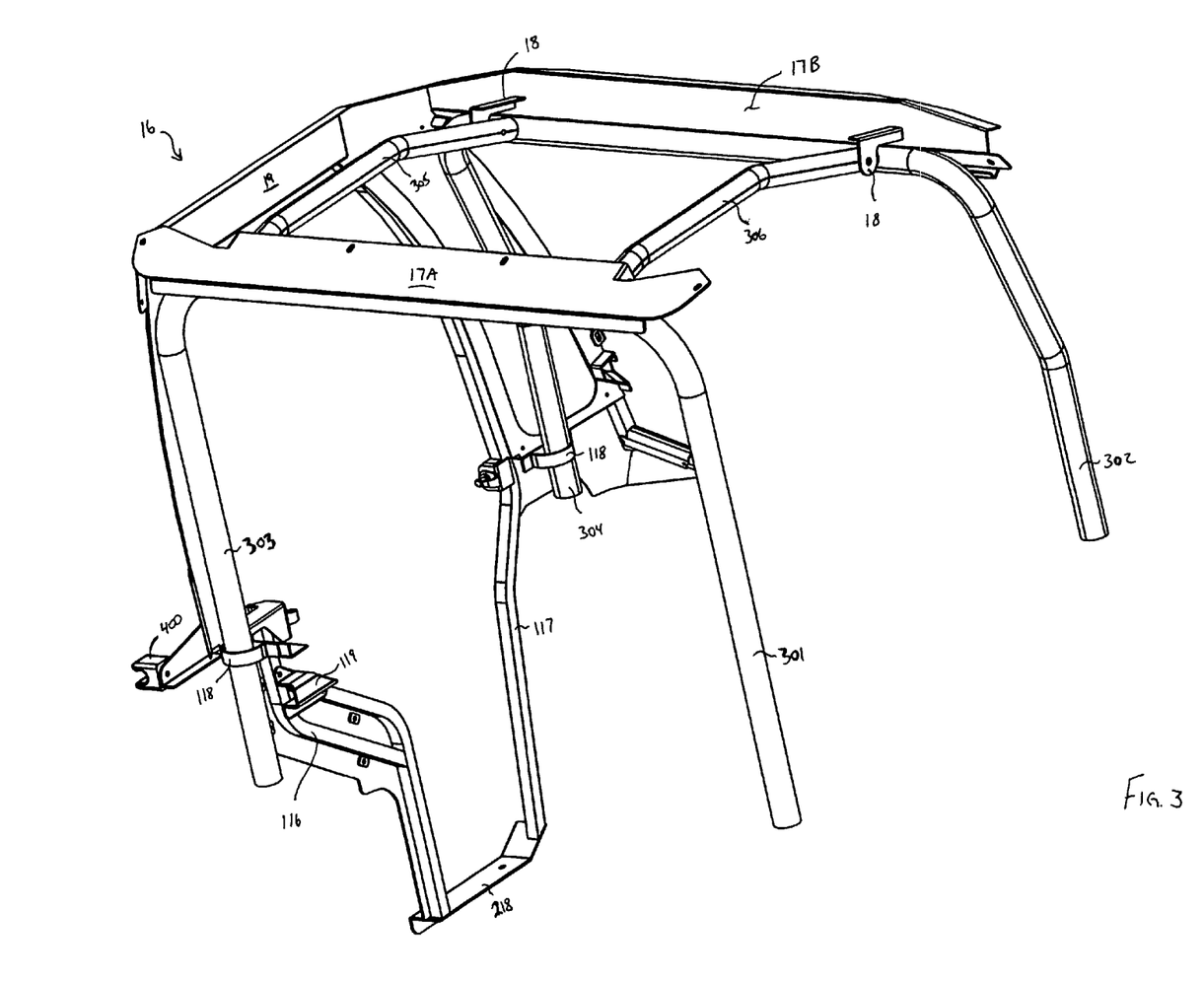
FIG. 3 is a perspective view a doorframe in accordance with the present invention.

Preferably the door assembly of the present invention is attached to the vehicle with minimal modification to the vehicle itself, utilizing existing structure. To that end, a doorframe shown generally at 16 in FIG. 3 includes spaced roof struts 17A, 17B that secure to the vehicle such as to the vehicle's existing roll over protection or operator protection system, which in the embodiment shown, includes four vertical roll posts 301, 302, 303 and 304, and horizontal roll posts 305, 306. Thus, suitable brackets 18 secure the roof struts 17A, 17B to connection points of the horizontal roll bars 305 and 306, or could secure directly to the bars. Similarly, suitable U-shaped brackets 118 secure the doorframe roll posts 303 and 304 as shown. A C-shaped bracket 119 secures the doorframe to the existing hip restraint bar (not shown) in the vehicle. Roof strut 17A connects to top frame member 19 and elongated side member 116. Similarly, roof strut 17B connects to side panel 80 as shown. Attachment points of the doorframe 16 may differ depending upon the type of b base vehicle, whether a roof is present as existing structure, whether a roll over protection or operator protection system is present, etc. Alternatively, the doorframe 16 can be formed as an integral part of the roll over protection or operator protection system (e.g., the components can be reinforced to provide the necessary rigidity and integrity to provide operator protection of roll over protection) or other cab frame structure and provided as original manufacturer's equipment, designed to facilitate the addition of doors. The doorframe 16 also includes opposite elongated side member 117, and base 218 to which side members 116 and 117 are secured. The base 218 secures to the vehicle, preferably the vehicle chassis, such as with a bolt. Preferably the elongated members 116 and 117 are each a continuous bent piece, and are preferably made of a rigid material, capable of withstanding repeated contact from the door itself. Suitable materials of construction include steel, preferably tubular for increased support, metal, aluminum and plastic, with steel being preferred. Although the doorframe assembly 16 is intended to be permanently mounted to the vehicle and become an integral part thereof (since it does not interfere with a user entering or exiting the vehicle, nor does it interfere with the operation or storage of the vehicle), it can be readily removed if desired. The doorframe defines a doorway, which can be blocked by closing door 20, as discussed in greater detail below.

Figure 4:
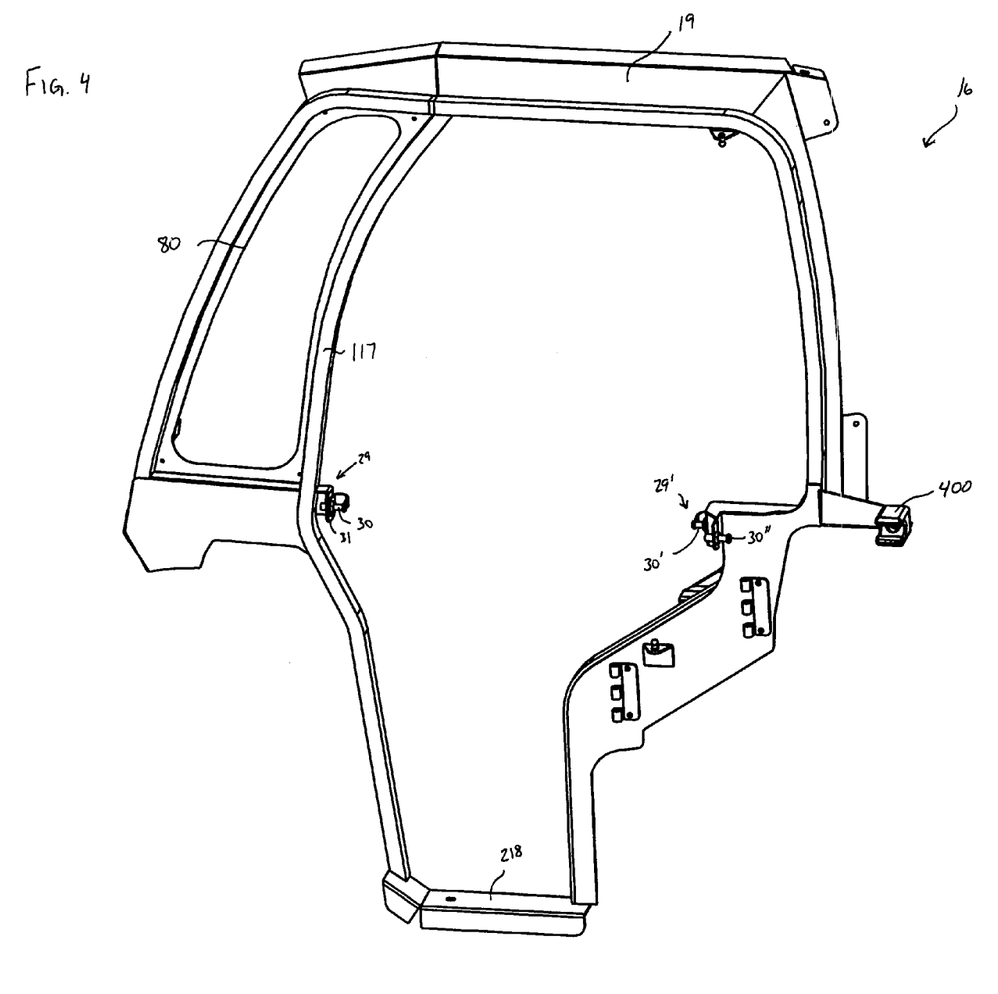
FIG. 4 is a front view of the doorframe of FIG. 3.
Figure 4A:
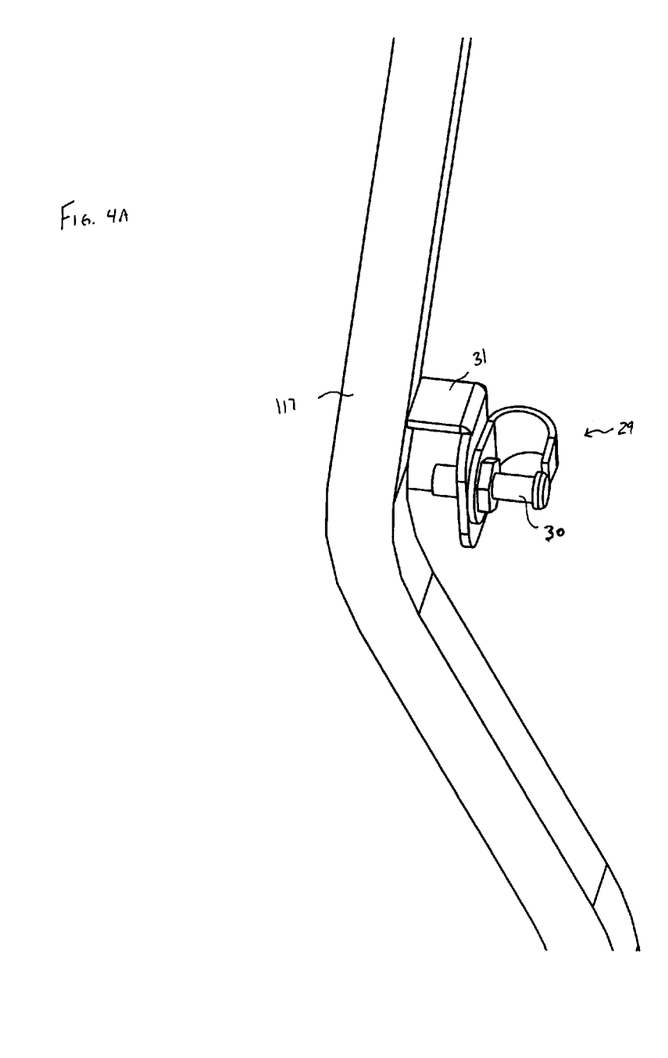
FIG. 4A is a perspective view of a striker assembly mounted on the doorframe of FIG. 3.

FIG. 4 shows a front view of the doorframe 16, where one suitable latch system is shown. Mounted to elongated side member 117 is a rotary latch striker mechanism 29, including a bracket 31 and striker pin 30. The striker mechanism is more clearly shown in FIG. 4A. A similar mechanism 29' is mounted on opposite elongated side member 116, in spaced vertical relation with striker mechanism 29 such that the striker pins 30 an 30' are preferably vertically aligned. However, striker mechanism 29' not only includes striker pin 30', but also a second striker pin 30" vertically aligned with strikers 30 and 30'. The striker pins are positioned and configured to engage rotary latches mounted to the door 20, as discussed in greater detail below.

Door 20 is designed to fit within the area of doorframe 16 defined by members 116, 117, 218 and 119 when the door is in the closed position, blocking ingress into and egress from the passenger compartment, and preferably closing in a weather-tight manner. The environment within the compartment defined with the doors closed can be controlled. Preferably the door 20 is made of a sturdy, durable, rigid material that can withstand harsh environmental conditions, and protect the passengers from weather. Suitable materials of construction include metal, fiber, fiberglass, stainless steel, aluminum and preferably plastic such as a polyolefin, including polyethylene and/or polypropylene. Preferably the door includes molded plastic supported about its perimeter by a tubular steel framework, and includes a transparent or translucent window portion 200 (FIG. 1) to permit the passengers viewing access to the exterior of the vehicle. The window portion 200 can be formed of any suitable material, such as acrylic, polycarbonate or glass.

Figure 5:
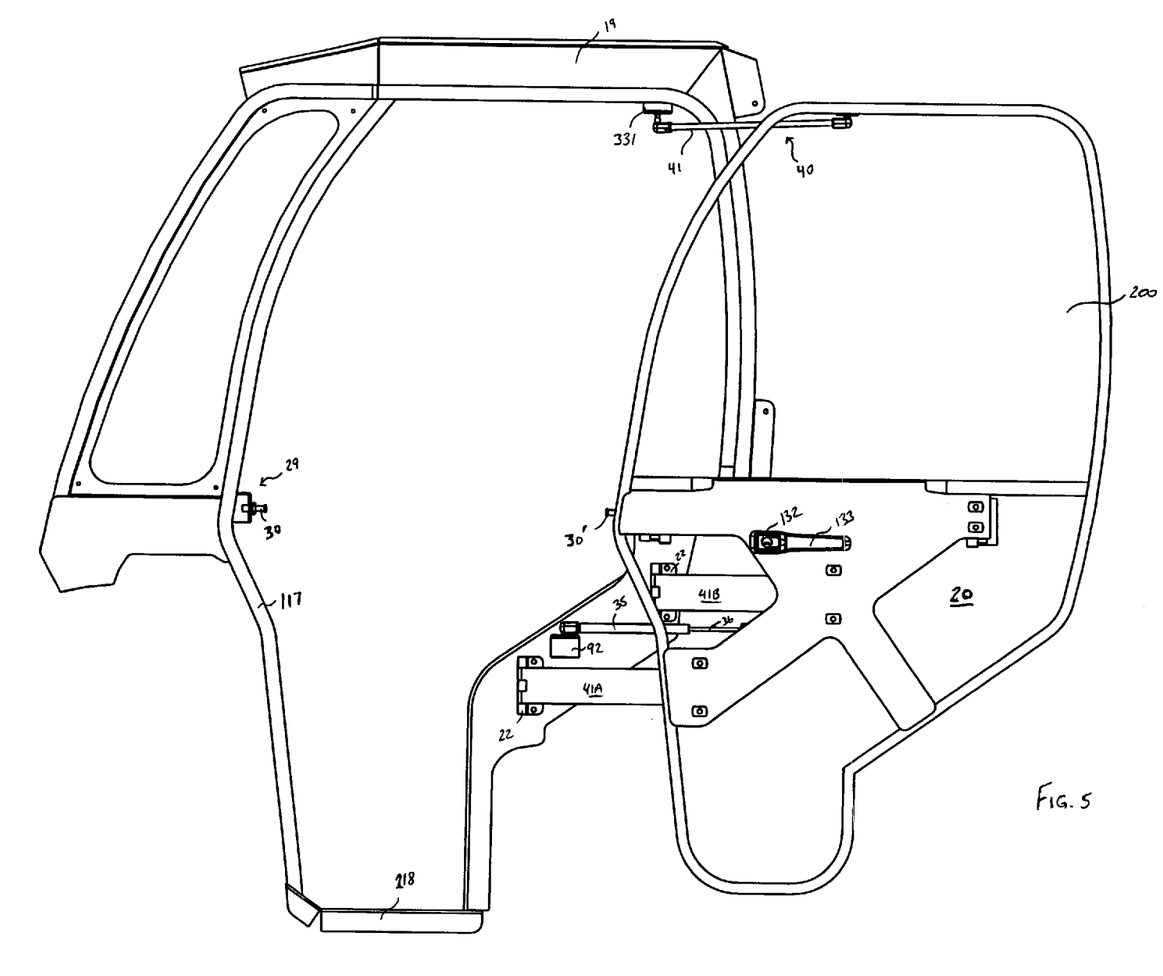
FIG. 5 is a front view of the doorframe of FIG. 3 shown with a door attached in an open position.
Figure 6:
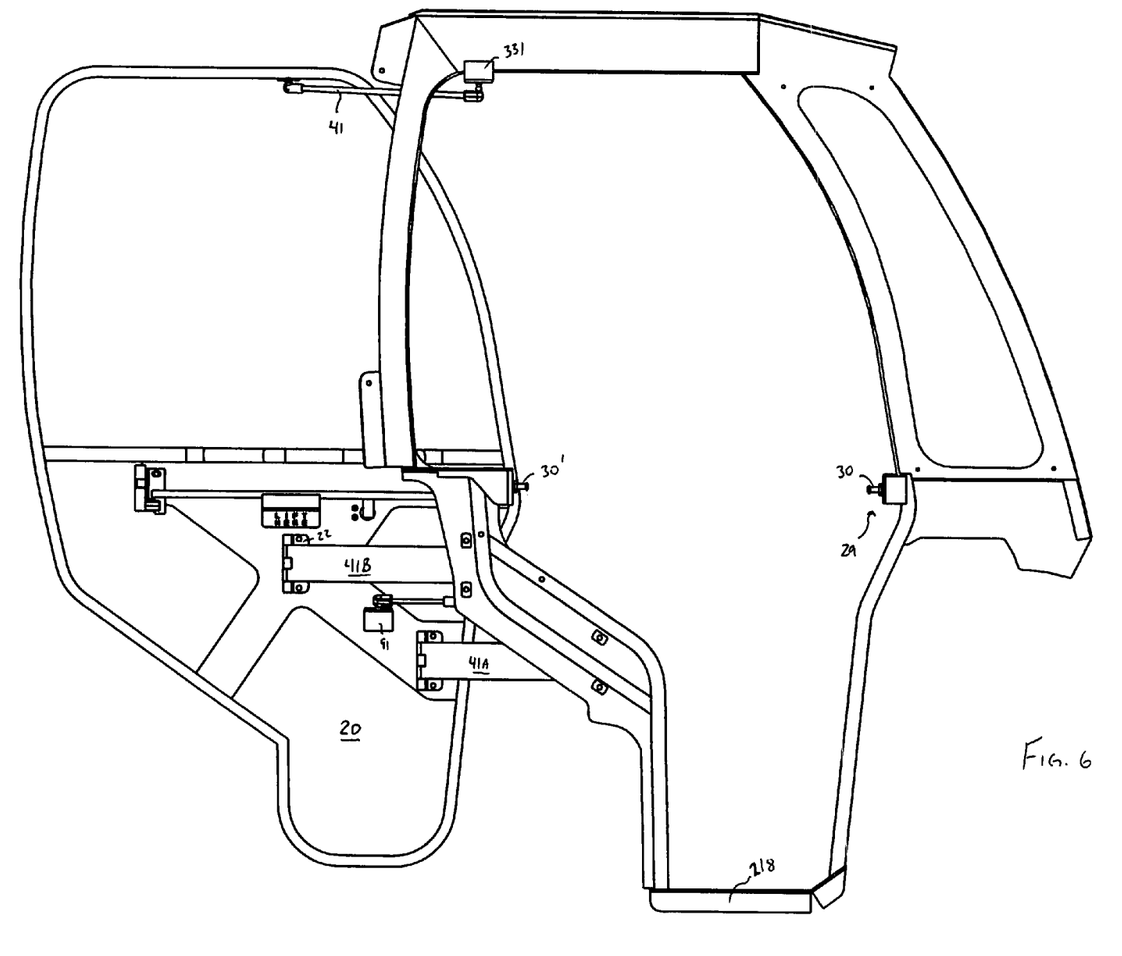
FIG. 6 is a rear view of the doorframe and open door of FIG. 5.

Turning now to FIGS. 5 and 6, embodiments of the door hinge assemblies are shown. An upper hinge assembly 40 includes a rigid member 41 such as a threaded rod or a metal strip having a first end pivotally attached to the door 20, and a second opposite end pivotally attached to the doorframe assembly via bracket 331. Each of the pivot points can be formed using any suitable means, such as a pin arrangement or a ball and socket joint. Preferably the mounting bracket 331 is located on the interior side of the doorframe assembly as shown. An advantage of mounting the upper hinge assembly in this manner is that most of the mechanism is hidden from outside view, particularly when the door is closed.

The upper hinge assembly 40 may optionally also include an assist (not shown), preferably a gas spring, compression of which causes energy to be stored in the device. If the assist is used, preferably it is mounted directly below (or above) the rigid member 41 (in the same vertical plane), but with offset pivot points located inwardly of the rigid member pivot points. Suitable pivot mounting configurations include eyelets and ball and socket configurations. When the door is positioned at the midpoint between the open and closed position, the assist is in a neutral position. As the door swings past the midpoint position (either towards a closed position or an open position), the energy stored in the assist is slowly released, causing the rod of the assist to extend, which in turn assists in forcing the door to its closed or open position, as the case may be. When in the open or closed position, the extension of the rod results in the length of the assist exceeding the length of rigid member 41. This optional assist also can help maintain the door in the open or closed position. Preferably the assist is dampened, so that the door decelerates as it closes.

Figure 7:
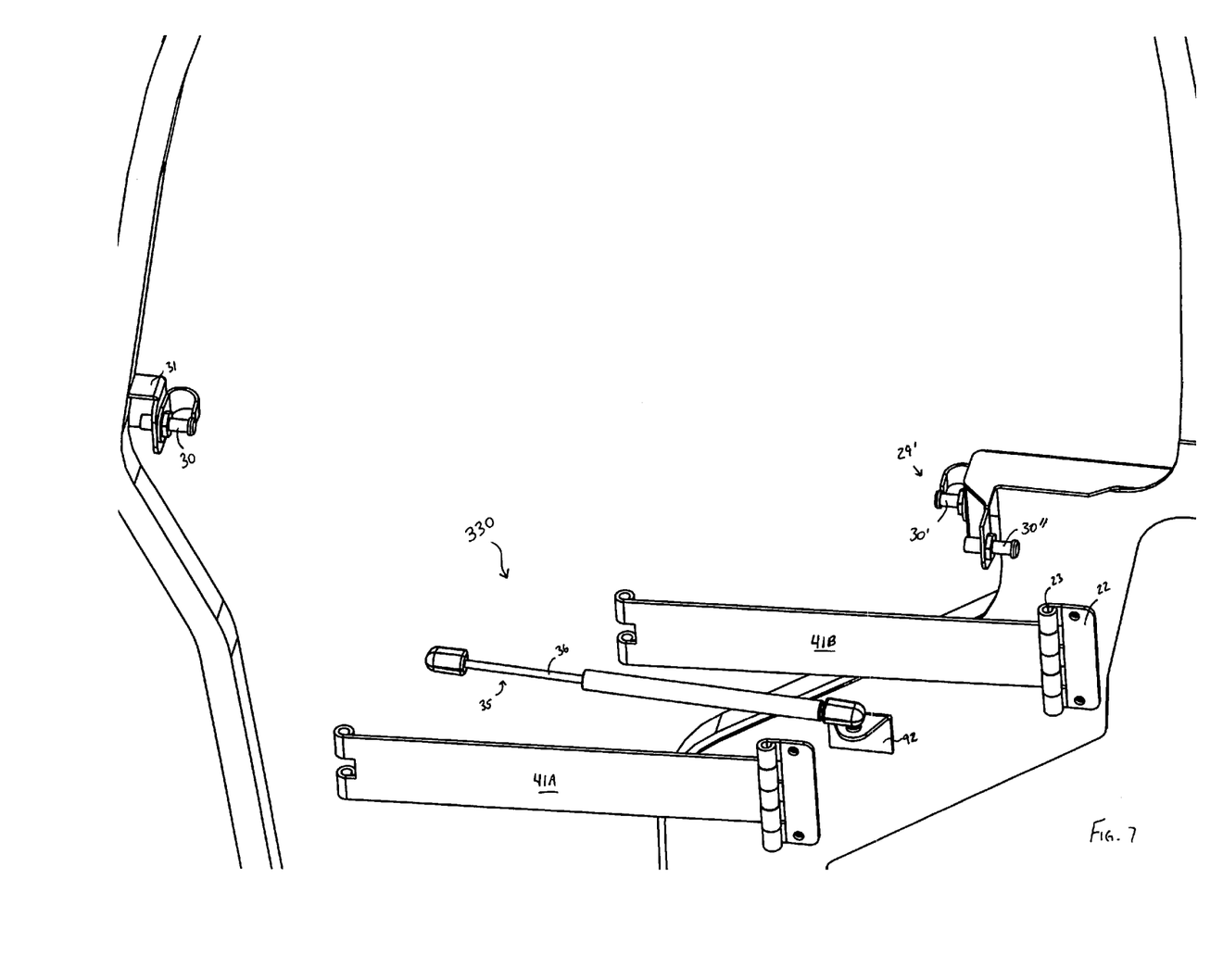
FIG. 7 is a perspective view of a door hinge assembly.

FIG. 7 illustrates lower hinge assembly 330, which preferably includes a pair of spaced rigid members 41A, 41B, each having a first end pivotally attached to the doorframe, and a second opposite end pivotally attached to the doorframe, as seen in FIG. 5. Preferably the rigid members 41A and 41B are not horizontally aligned in order to ensure clearance during operation of the door 20. The rigid members 41A and 41B are of equal length, and are equal in length to rigid member 41 of upper hinge assembly 40, so that the door remains aligned with the frame. The rigid members 41, 41A and 41B are all preferably parallel. The particular length chosen for the rigid members depends upon the distance (the diameter of the semi-circle formed during the path of door travel) desired for the door to open/close, as discussed in greater detail below. Each of the pivot points can be formed using any suitable means, such as a bracket 22 and pin 23 arrangement as shown in FIG. 7. Preferably at least one of the pin arrangements is adjustable, so that proper alignment of the door is ensured. The lower hinge assembly 330 also preferably includes an assist 35 to help open and close door 20, such as a gas spring, compression of which results in energy being stored in the device. In the embodiment shown, the assist 35 is located at or near the midpoint between the planes defined by the spaced rigid members 41A, 41B. That is, when the lower hinge assembly is in its maximum extended position (i.e., the door is positioned at the midpoint between the open and closed position and is at its farthest point away from the vehicle), the assist 35 is parallel to the rigid members and is located at or near the midpoint between their planes. Accordingly, movement of the rigid members in either direction will cause the assist 35 to expand, thereby assisting in the movement of the door 20. Alternatively, the assist 35 could be mounted directly below (or above) the rigid member 41A (in the same vertical plane), but with pivot points located inwardly of the rigid member 41A pivot points. As with the optional upper hinge assembly assist, when the door is positioned at the midpoint between the open and closed position, the assist 35 is in a neutral position. As the door swings past the midpoint position (either towards a closed position or an open position), the energy stored in the assist 35 is slowly released, causing the rod 36 of assist 35 to extend, which in turn assists in forcing the door to its closed or open position, as the case may be, and maintaining it in that state. The assist 35 can be dampened, so that the door decelerates as it closes. The assist 35 is shorter in length than rigid members 41A, 41B and thus one end of assist 35 is fixed to bracket 91, which is positioned inwardly of bracket 22 for rigid member 41B, as shown in FIG. 6, and the opposite end is fixed to bracket 92, which is positioned inwardly of bracket 22 for rigid member 41A, as shown in FIGS. 5 and 7.

Those skilled in the art will appreciate that for optimal operation of the door, at least three rigid members 41 should be used. Although in the embodiment shown, there is one upper rigid member 41 and two lower rigid members 41A, 41B, the upper hinge assembly could include two or more rigid members. Similarly, the lower hinge assembly could include only one rigid member 41, or two or more. The three rigid members define three pivot locations offset from horizontal with respect to each other, and offset vertically from each other. Those skilled in the art will appreciate that more than three pivot locations could be used with out departing from the spirit and scope of the invention.

Figure 8:
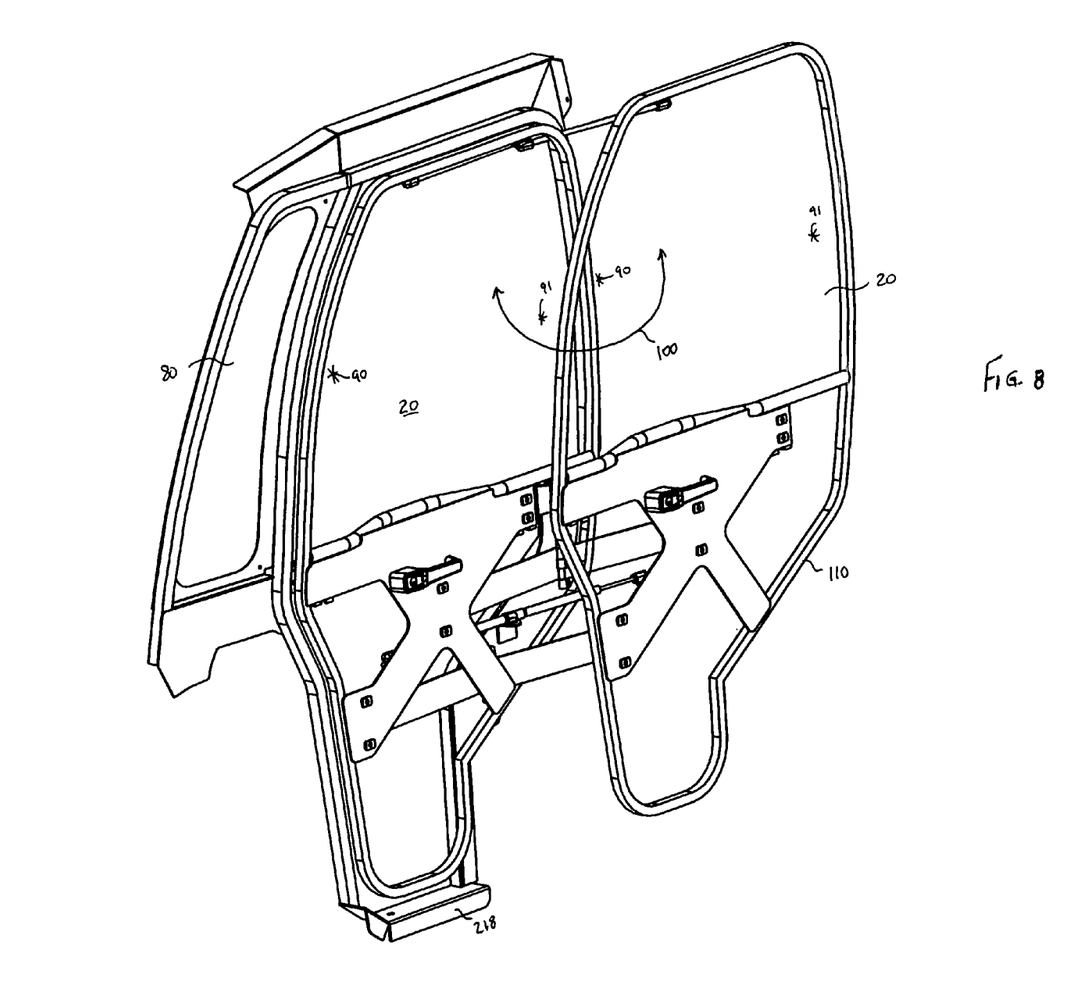
FIG. 8 is a perspective view of the doorframe and door assembly showing the door in open and closed positions.

Turning now to FIG. 8, the motion of the door 20 from the closed state to the open state is shown. As the door is moved from the closed state to the open state. (preferably manually), or from the open state to the closed state (preferably manually), its path of travel defines a semi-circle, as depicted by arrow 100 in FIG. 8. The semi-circle so defined is of equal diameter regardless of the reference point of the door used. For example, the semi-circle defined by the path of travel of reference point 90 on the front surface of the door as shown in FIG. 8 has the same diameter as the semi-circle defined by the path of travel of reference point 91 at the opposite marginal side on the front surface of the door 20, or for that matter, of any other reference point at any other place, on the same surface of the door. Similarly, the paths of travel of the rigid members 41, 41A and 41B also define semi-circles of equal diameters as viewed from reference points at the same relative position on each rigid member. As a result, opening and closing of the door 20 can be carried out even when the vehicle is in a confined space. Indeed, substantially less clearance is required than that of a door of identical size that is hinged at one end and swings outwardly, as the maximum distance the door 20 of the present invention moves outwardly from the vehicle is less than the maximum width of the door 20.

As seen in FIG. 8 for example, preferably the lower rearward side of the door 20 (and doorframe 16) has a bent portion 110, angling towards the front of the vehicle and configured to complement the contour of rear wheel fender 101 (FIG. 1) and leave the rear wheel 44 exposed even when the door is in the open position. As a result, when the door is in the open position (FIG. 2), it does not interfere with the operation of the real wheel 44, and creates an aesthetically pleasing appearance. As indicated above, the distance that the door 20 is designed to open is dictated by the length of the rigid members 41, 41A and 41B. Accordingly, this length preferably is chosen so that the lower bent portion 110 of the door 20 aligns with the similarly shaped fender (or wheel well) of the vehicle when the door 20 is in the open, stored position.

Turning back to FIG. 1, there is shown front panels 80, 80'. The panels 80, 80' are preferably permanently installed, since they do not interfere with the ingress or egress from the passenger compartment, although the panels could be made to be removable if desired. Each panel is preferably framed as part of the doorframe 16. The panels 80, 80' preferably include a transparent or translucent window supported by the frame and made of acrylic, polycarbonate or glass to enhance passenger visibility.

Figure 9:
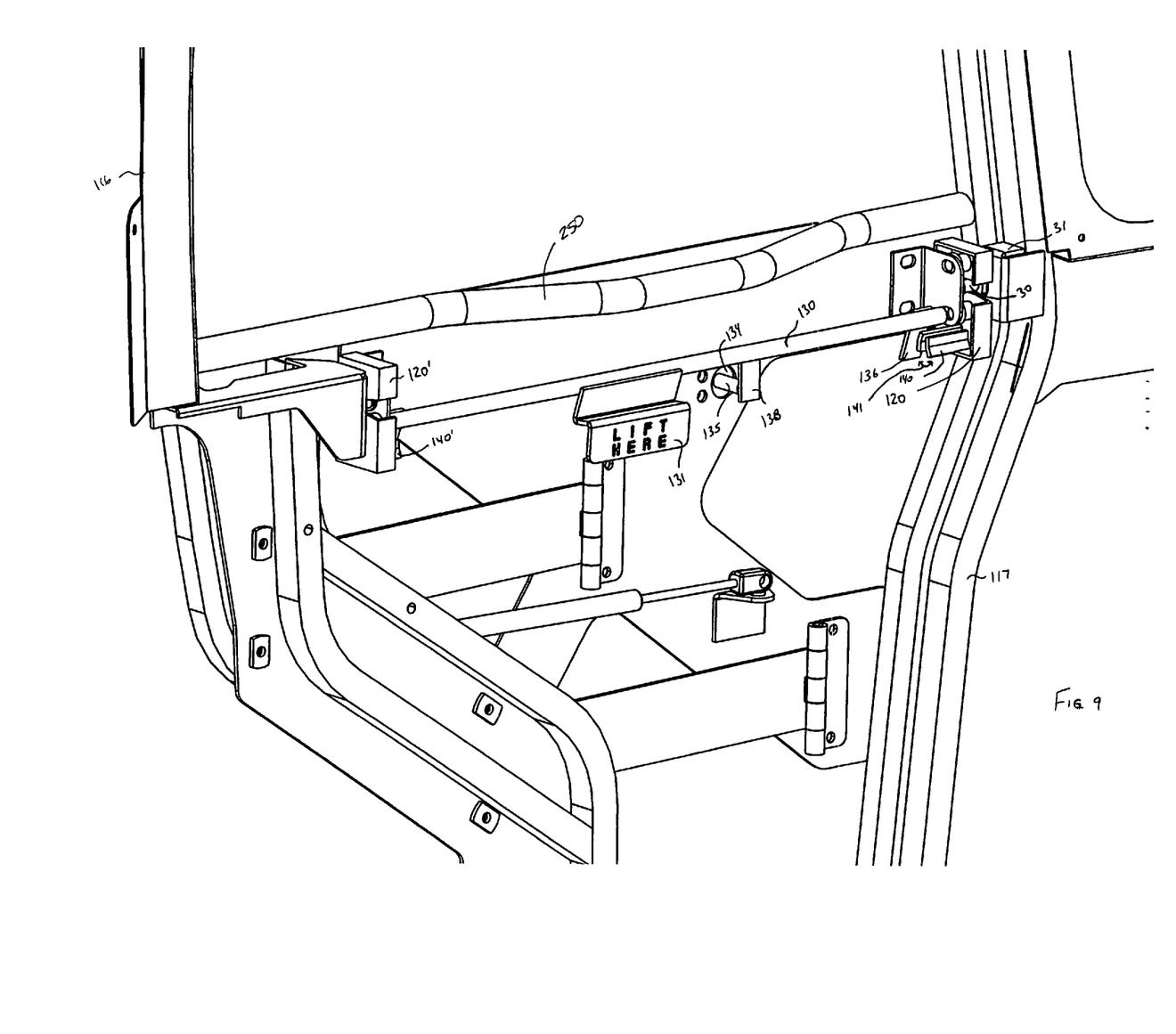
FIG. 9 is a first perspective view of a door latching assembly.
Figure 10:
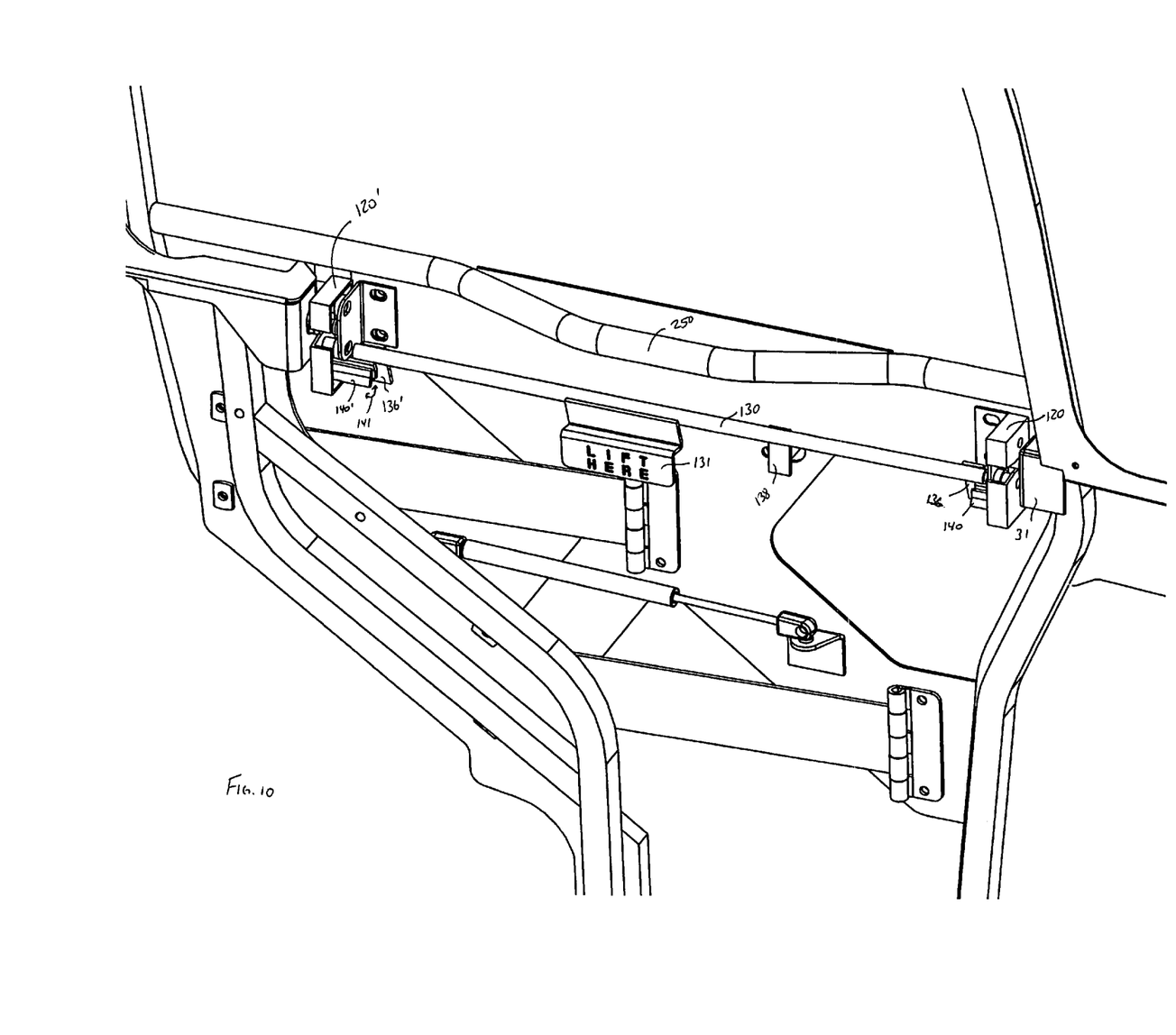
FIG. 10 is a second perspective view of a door latching assembly.

To retain or lock the door 20 in its open and/or closed position, a rotary latch system preferably is used. As shown in FIG. 9, a pair of rotary latches 120, 120' are mounted on the door 20 in spaced location so as to receive in locking engagement a respective striker pin 30, 30' when the door is closed. Upon closing the door, the striker pins 30, 30' engage respective latch cams in the rotary latches 120, 120' and slide back into the latch body along with the cam. The strikers remain within the body of the latch, providing a strong and secure connection. Suitable latches include single actuation and dual actuating rotary latches. On opening, the latch cam rotates out of the body to disengage from the striker pin. Actuation of the rotary latches 120, 120' to open the door preferably is carried out simultaneously or nearly simultaneously, using actuating rod or link 130. The rod or link 130 can be actuated from within the passenger compartment of the vehicle, such as by lifting handle 131 coupled to the rod 130, or can be actuated from outside the vehicle, such as by depressing plunger 132 on handle 133 (FIG. 5), which communicates with rod extension 135 that is positioned in door aperture 134 and is coupled to the rod 130 via plate 138. In either case, actuation of rod 130 causes the rod to rotate. The rod includes tabs 136, 136' (FIG. 10) that contact respective tabs 140, 140' of the latches upon actuation of the rod 130, rotating the tabs from a striker pin locking position to a striker pin releasing position as shown by the arrows 141 in FIGS. 9 and 10. This, in turn, rotates each respective cam in the rotary latch, which disengages the striker pins 30, 30', allowing the door 20 to be opened. In view of the simultaneous or near-simultaneous latching that occurs upon the push-to-close and/or gas spring-assisted operation of the door, the door closes in a well-sealed and secure manner. Handle 250 can be provided to assist in operating the door.

Those skilled in the art will appreciate that the rotary latch could be located on the doorframe, and the striker pins on the door.

The door also secures (and stores) in the open position by utilizing striker 30", which engages with rotary latch 120 when the door is in its fully opened position, as shown in FIG. 5. A similar actuation to that discussed above to rod 130 disengages the rotary latch 130 from striker 30" to close the door. The engagement of striker 30" with the rotary latch 120 can be caused by the force from the stored energy in the gas spring(s), and/or can be caused by manual force applied to the door, such as by applying a pushing force to the outer surface of the door in the general location of the latch mechanism. A similar force can be used to ensure that the door is secured in the open position. The door can be retained in this position even during movement of the vehicle, including speeds of about 40-50 MPH consistent with some of the UTV's currently on the market.

An audible "clicking" sound can be heard when the striker pin engages the latch, and where dual actuation latches are used, when the striker pin is further locked in the latch mechanism, thereby confirming the latching.

In certain instances, such as when the vehicle includes a hydraulically actuated dump bed, it may be desirable to ensure that when the door 20 is in the open, secured position, sufficient clearance between the door and the dump bed is present to allow normal operation of the dump bed without interference from the door. One approach to ensuring such clearance, and also to cushion the door in the open position, is by providing one or more bumpers 400 (FIG. 3) at one or more locations on the door or doorframe. The bumper 400 shown is configured to receive handled 250 of the door 20 when the door is in the open, secured position, such as by having a keyhole shaped opening, and functions to cushion the door and retain it a fixed, predetermined distance from the vehicle (or dump bed, for example). Other bumpers can be placed at the top and bottom of the door, and/or on the rigid member 41 of the upper hinge assembly, for example, to provide further cushioning and/or clearance assurance.

The doors, together with the windshield, roof and rear panels, combine to enclose the passenger compartment in which the climate, particularly including the temperature but also potentially the humidity, can be further controlled such as with a heating unit that can be installed to supply heat to the compartment. For example, an overhead console can be installed in the compartment, such as by securing it to the roof, or can be mounted to a side frame or behind the dashboard. The unit can include a heating mechanism such as an electric heating element, black heat, or a heater tied to the engine cooling system, and a variable speed fan, as well as multi-direction louvers to aim the airflow. The unit can be wired to the vehicle battery for power. The power supply can relay off the vehicle acceleration pedal so that the unit runs only when the pedal is depressed, thereby avoiding unnecessary battery drain. Alternatively, the power supply can come from the gas-powered or diesel-powered vehicle engine. Cooling air also can be provided.

In view of the effective seal that is created when the door is closed (the perimeter of the door preferably includes a rubber gasket), and in view of the relatively small passenger compartment, the climate within the compartment can be maintained at an acceptable temperature or within an acceptable temperature range.

What is claimed is:

1. A door assembly for a vehicle, comprising:
   a door;
   a hinge assembly for moving said door from a closed position to an open and stored position;
   a door latching system comprising a first latch positioned to latch to a first portion of said door, and a second latch spaced from said first latch and positioned to latch to a second portion of said door, wherein said first portion of said door engages said first latch and second portion of said door engages said second latch when in said closed position, and wherein said second portion of said door engages only said first latch when in said open and stored position.

2. The door assembly of claim 1, wherein said door has a surface, and wherein said hinge assembly provides a path of door travel from said door closed position to said door open and stored position such that any two points on the same surface of said door travel in semicircles of the same diameter.

3. The door assembly of claim 2, wherein said hinge assembly comprises an assist for biasing said door to said open and stored or said closed position upon said door passing through its midpoint of travel.

4. The door assembly of claim 3, wherein said assist comprises a gas spring.

5. The door assembly of claim 1, wherein said first and second latches are aligned so that said door is moved to its closed position, said door engages said latches simultaneously.

6. The door assembly of claim 1, wherein said vehicle is a utility terrain vehicle.

7. The door assembly of claim 1, wherein said vehicle is a 2-wheel drive, 4-wheel drive or all-wheel drive capable vehicle.

8. The door assembly of claim 1, wherein said vehicle has a rear wheel well, and wherein the contour of said door is shaped to match the contour of said rear wheel well.

9. The door assembly of claim 1, wherein said vehicle has a rear wheel, and wherein the contour of said door is shaped such that when said door is in said open position, said rear wheel remains exposed.

10. A vehicle, comprising a chassis, a passenger compartment, and a door assembly, said door assembly comprising:
    a doorframe defining a doorway;
    a door;
    a hinge assembly for moving said door from a closed position to an open and stored position;
    a door latching system comprising a first latch positioned to latch to a first portion of said door, and a second latch spaced from said first latch and positioned to latch to a second portion of said door, wherein said first portion of said door engages said first latch and said second portion of said door engages said second latch when in said closed position, and wherein said second portion of said door engages only said first latch when in said open and stored position.

11. The vehicle of claim 10, wherein said door has a surface, and wherein said hinge assembly provides a path of door travel from said door closed position to said door open and stored position such that any two points on the same surface of said door travel in semicircles of the same diameter.

12. The vehicle of claim 11, wherein said hinge assembly comprises an assist for biasing said door to said open and stored or said closed position upon said door passing through its midpoint of travel.

13. The vehicle of claim 12, wherein said assist comprises a gas spring.

14. The vehicle of claim 10, wherein said first and second latches are aligned so that said door is moved to its closed position, said door engages said latches simultaneously.

15. The vehicle of claim 10, wherein said vehicle is a utility terrain vehicle.

16. The vehicle of claim 10, wherein said vehicle is a 2-wheel drive, 4-wheel drive or all-wheel drive capable vehicle.

17. The vehicle of claim 10, wherein said vehicle has a rear wheel well, and wherein the contour of said door is shaped to match the contour of said rear wheel well.

18. The vehicle of claim 10, wherein said vehicle has a rear wheel, and wherein the contour of said door is shaped such that when said door is in said open position, said rear wheel remains exposed.

* * * * *